(12) United States Patent
Kato et al.

(10) Patent No.: US 11,459,092 B2
(45) Date of Patent: Oct. 4, 2022

(54) AIRCRAFT STEERING SYSTEM, AIRCRAFT, AND AIRCRAFT STEERING METHOD

(71) Applicant: SUBARU CORPORATION, Tokyo (JP)

(72) Inventors: Hiroki Kato, Tokyo (JP); Nobuyuki Nakazato, Tokyo (JP); Iwao Murata, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 804 days.

(21) Appl. No.: 16/375,141

(22) Filed: Apr. 4, 2019

(65) Prior Publication Data

US 2019/0344878 A1   Nov. 14, 2019

(30) Foreign Application Priority Data

May 8, 2018   (JP) .............................. JP2018-089702

(51) Int. Cl.
*B64C 13/50* (2006.01)
*B64C 23/00* (2006.01)
*F16D 37/00* (2006.01)

(52) U.S. Cl.
CPC ............ *B64C 13/50* (2013.01); *B64C 23/005* (2013.01); *F16D 37/008* (2013.01); *B64C 2230/12* (2013.01); *F16D 2037/001* (2013.01); *F16D 2500/1023* (2013.01); *F16D 2500/10475* (2013.01); *F16D 2500/30401* (2013.01)

(58) Field of Classification Search
CPC ... B64C 23/005; B64C 2230/12; B64C 13/38; B64C 13/50; B64C 13/504; B64C 13/505; F15D 1/0075
See application file for complete search history.

(56) References Cited

U.S. PATENT DOCUMENTS 7,624,941 B1 * 12/2009 Patel .................... B62D 35/007
                                                         244/3.22
8,220,753 B2 *  7/2012 Silkey ...................... F15D 1/12
                                                         244/204.1
(Continued)

FOREIGN PATENT DOCUMENTS

DE    102013005336 A1 * 10/2014 ............. B64C 13/50
EP       1795987 A2 *  6/2007 ............. B64C 13/42
(Continued)

OTHER PUBLICATIONS

Japanese Office Action with Machine Translation dated Mar. 1, 2022 in Japanese Patent Application JP 2018-089702; 5 pages.

*Primary Examiner* — Joshua J Michener
*Assistant Examiner* — Ryan Andrew Yankey
(74) *Attorney, Agent, or Firm* — Troutman Pepper Hamilton Sanders LLP (57) ABSTRACT

An aircraft steering system includes an electric actuator, a clutch, at least one plasma actuator, and a controller. The electric actuator is configured to vary an angle of a flight control surface of an aircraft. The clutch is configured to cut off torque by driving of the electric actuator. The torque is to be transmitted to the flight control surface. The at least one plasma actuator is configured to form a flow of air on a surface of the flight control surface when the torque is cut off. The controller is configured to control the electric actuator, the clutch, and the at least one plasma actuator.

13 Claims, 7 Drawing Sheets

(56) References Cited

U.S. PATENT DOCUMENTS

| | | | |
|---|---|---|---|
| 10,179,643 B2 * | 1/2019 | Nfonguem | F16D 37/02 |
| 11,208,201 B2 * | 12/2021 | Kato | B64C 9/18 |
| 11,214,359 B2 * | 1/2022 | Kikuchi | B64C 9/00 |
| 2003/0080246 A1 | 5/2003 | Koizumi et al. | |
| 2007/0194738 A1 | 8/2007 | Hirai | |
| 2010/0004799 A1 * | 1/2010 | Drouin, Jr. | B64C 23/005 |
| | | | 701/3 |
| 2010/0224733 A1 | 9/2010 | Wood et al. | |
| 2011/0253842 A1 | 10/2011 | Silkey et al. | |
| 2013/0067898 A1 | 3/2013 | Onishi et al. | |
| 2015/0308549 A1 | 10/2015 | Hirai et al. | |
| 2019/0127051 A1 * | 5/2019 | Miyawaki | F15D 1/008 |
| 2019/0193843 A1 * | 6/2019 | Kikuchi | B64C 9/18 |
| 2019/0329870 A1 * | 10/2019 | Kato | B64C 21/00 |
| 2021/0129978 A1 * | 5/2021 | Kato | F15D 1/0075 |

FOREIGN PATENT DOCUMENTS

| | | | | |
|---|---|---|---|---|
| EP | 2441669 B1 * | 1/2017 | | B64C 21/00 |
| JP | 2003112693 A | 4/2003 | | |
| JP | 2007-155075 A | 6/2007 | | |
| JP | 2009-511360 A | 3/2009 | | |
| JP | 2013-064416 A | 4/2013 | | |
| JP | 2013-530486 A | 7/2013 | | |
| JP | 2015216837 A | 12/2015 | | |
| WO | WO-2011095360 A1 * | 8/2011 | | B64C 13/50 |

* cited by examiner

AIRCRAFT STEERING SYSTEM, AIRCRAFT, AND AIRCRAFT STEERING METHOD

CROSS-REFERENCE TO RELATED APPLICATIONS

The present application claims priority from Japanese Patent Application No. 2018-089702 filed on May 8, 2018, the entire contents of which are hereby incorporated by reference.

BACKGROUND

Some implementations of the technology relate to an aircraft steering system, an aircraft, and an aircraft steering method.

A steering system using an electric actuator has been known as a steering system directed to operation of a control surface of an aircraft. Typical types of an electric actuator for an aircraft include an electrohydrostatic actuator (EHA) and an electromechanical actuator (EMA). The EHA is an electric actuator in which a hydraulic pump for supplying hydraulic oil to a hydraulic actuator is driven by an electric motor. For example, reference is made to Japanese Unexamined Patent Application Publication No. 2013-064416. On the other hand, the EMA is an electric actuator that is driven by a member such as an electric cylinder, a gear, or a screw without using hydraulic pressure.

Further, a study for using a plasma actuator (PA) as an auxiliary actuator to be attached to a wing of an aircraft has been made. For example, references are made to Japanese Unexamined Patent Application Publications No. 2009-511360 and No. 2013-530486. A practical PA to be attached to the wing of the aircraft includes a dielectric barrier discharge plasma actuator (DBD-PA) in which a flow of air is formed by using dielectric barrier discharge.

The DBD-PA is a PA in which electrodes are arranged to put a dielectric therebetween and plasma is generated on only one surface of the dielectric by applying high alternating-current (AC) voltage between the electrodes. By using the DBD-PA, it is expected that an air flow is varied by controlling the plasma. Therefore, an attempt has been made to omit a flight control surface or movable wing such as an aileron or a flap by attaching the DBD-PA to the wing.

It is important to cause an actuator directed to driving of a control surface of an aircraft to have redundancy. The redundancy means a property that an operation of a system may be maintained even in a case where a trouble or failure occurs in a part of the system. Here, it is required to provide an auxiliary system in order to give redundancy to a target system.

Non-limiting examples of an actuator provided with redundancy may include the following actuator. This actuator is configured to expand and contract a rod also by means of an electric motor by switching from a hydraulic drive mode to an electric drive mode by an electromagnetic clutch in a case where a hydraulic pump directed to supplying of hydraulic oil to a hydraulic actuator has a malfunction. For example, reference is made to Japanese Unexamined Patent Application Publication No. 2007-155075.

SUMMARY

An aspect of the technology provides an aircraft steering system that includes an electric actuator, a clutch, at least one plasma actuator, and a controller. The electric actuator is configured to vary an angle of a flight control surface of an aircraft. The clutch is configured to cut off torque by driving of the electric actuator. The torque is to be transmitted to the flight control surface. At least one plasma actuator is configured to form a flow of air on a surface of the flight control surface when the torque is cut off. The controller is configured to control the electric actuator, the clutch, and the at least one plasma actuator.

An aspect of the technology provides an aircraft comprising an aircraft steering system that includes an electric actuator, a clutch, at least one plasma actuator, and a controller. The electric actuator is configured to vary an angle of a flight control surface of an aircraft. The clutch is configured to cut off torque by driving of the electric actuator. The torque is to be transmitted to the flight control surface. At least one plasma actuator is configured to form a flow of air on a surface of the flight control surface when the torque is cut off. The controller is configured to control the electric actuator, the clutch, and the at least one plasma actuator.

An aspect of the technology provides an aircraft steering method including steering, with an aircraft steering system, at least one flight control surface provided to an aircraft. The aircraft steering system includes an electric actuator, a clutch, at least one plasma actuator, and a controller. The electric actuator is configured to vary an angle of a flight control surface of an aircraft. The clutch is configured to cut off torque by driving of the electric actuator. The torque is to be transmitted to the flight control surface. At least one plasma actuator is configured to form a flow of air on a surface of the flight control surface when the torque is cut off. The controller is configured to control the electric actuator, the clutch, and the at least one plasma actuator.

DETAILED DESCRIPTION

An aircraft steering system, an aircraft, and an aircraft steering method according to an implementation of the technology will be described with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example implementations which are not recited in a most-generic independent claim of the disclosure are optional and may be provided on an as-needed basis. Throughout the present specification and the drawings, elements having substantially the same function and configuration are denoted with the same numerals to avoid any redundant description.

An electric actuator of an aircraft may include an EHA, for example. In order to provide redundancy to an aircraft steering system including the EHA, it is required to provide a plurality of hydraulic systems in the aircraft steering system. This causes an increase in weight of the aircraft, and this also causes complication of a system configuration and complication of maintenance.

Further, in recent years, an attempt is made to replace the EHA with an EMA. Here, the EHA requires a hydraulic system, but the EMA does not require a hydraulic system. However, in case of the EMA, many gears are provided therein and jamming may occur easily. Thus, redundancy is very important. It is to be noted that the jamming is a malfunction that a gear mechanically stops moving.

However, a highly-complicated system may be required to mechanically provide redundancy to an aircraft steering system including the EMA provided with many gears. This causes a significant increase in weight of the aircraft steering system. As a result, redundancy becomes unrealistic, and it is now in a state where replacement of the EHA with the EMA does not progress.

It is desirable to provide redundancy to an aircraft steering system with a simple configuration.

[Aircraft Steering System]

Figure 1:
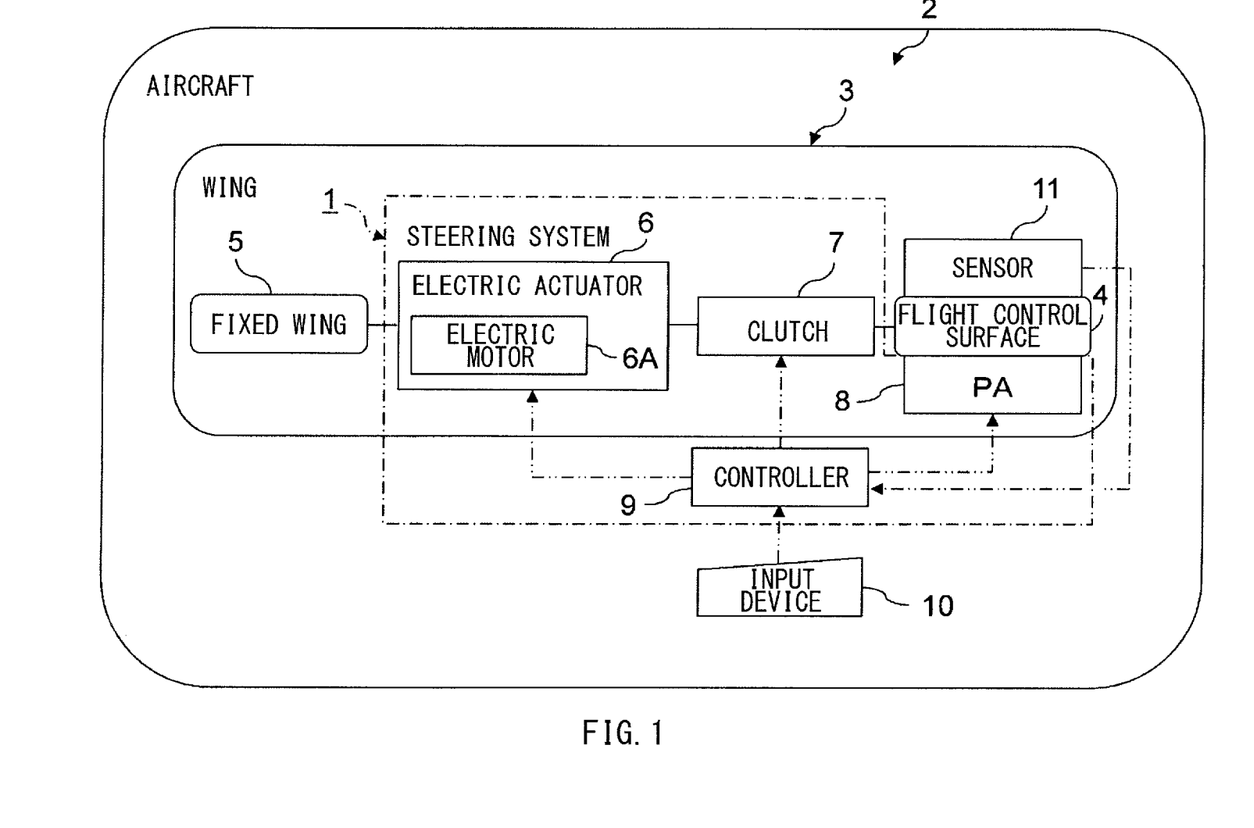
FIG. 1 is a block diagram illustrating an example of a configuration of an aircraft steering system according to an implementation of the technology.

FIG. 1 is a block diagram illustrating an example of a configuration of an aircraft steering system according to an implementation of the technology.

A steering system 1 may adjust an angle of a flight control surface (or a movable wing) 4. The flight control surface 4 may be provided on a wing 3 of an aircraft 2, such as main wings, a vertical tail, or horizontal tails. Therefore, the steering system 1 may be mounted on the aircraft 2 provided with the flight control surface 4. The aircraft 2 on which the steering system 1 is to be mounted may be an unmanned aircraft or a manned aircraft. Non-limiting examples of the flight control surface 4 to be steered may include an aileron, a rudder, an elevator, a flap, a spoiler, and an air brake. The flight control surface 4 may typically be coupled to a fixed wing 5.

The steering system 1 may include an electric actuator 6, a clutch 7, at least one PA 8, and a controller 9.

The electric actuator 6 is configured to vary an angle of the flight control surface 4 of the aircraft 2. Namely, the electric actuator 6 may include an electric motor 6A. The electric actuator 6 may vary an angle of attack by transmitting rotary motion of an output shaft of the electric motor 6A to the flight control surface 4. Mechanical elements such as a power cylinder that is a telescopic mechanism, a gear, or a link mechanism may be provided in the electric actuator 6 in addition to the electric motor 6A if necessary.

The electric actuator 6 having a configuration in which a hydraulic pump is driven by the electric motor 6A to expand and contract a hydraulic cylinder by hydraulic oil supplied from the hydraulic pump is called the EHA.

In contrast, the electric actuator 6 that does not use hydraulic pressure is called the EMA. A typical EMA may include the electric motor 6A and an electric cylinder configured to be expanded and contracted by the electric motor 6A. A typical electric cylinder may include a ball screw to be rotated by the electric motor 6A, and a rod to which a nut is coupled. The nut may be moved linearly by rotation of the ball screw. However, the EMA may include only the electric motor 6A without being provided with an electric cylinder. Alternatively, the EMA may be configured by coupling a member such as a gear or a link mechanism to the electric motor 6A.

The flight control surface 4 may typically be coupled to the fixed wing 5. The electric actuator 6 may thus be provided between the fixed wing 5 and the flight control surface 4. Namely, part of the electric actuator 6 may be fixed to the fixed wing 5, and a movable portion of the electric actuator 6 may be coupled to the flight control surface 4.

By using the EMA as the electric actuator 6, necessity of a hydraulic system may be eliminated. This makes it possible not only to reduce the weight and simplify maintenance of the electric actuator 6, but also to avoid a risk such as ignition to hydraulic oil. However, the EMA may typically have a plurality of gears. There may be a risk that jamming in which a gear mechanically stops moving may occur. Therefore, it may be important to provide redundancy to the steering system 1 in preparation for a malfunction of the EMA. Further, in addition to a case where the electric actuator 6 is the EMA, also in a case where the electric actuator 6 is the EHA, it may be important to provide redundancy to the steering system 1 in preparation for a malfunction of the EHA.

The clutch 7 is provided in the steering system 1. The clutch 7 is configured to cut off torque by driving of the electric actuator 6. The torque is to be transmitted to the flight control surface 4. Namely, in a case where the electric actuator 6 has a malfunction, the controller 9 may actuate the clutch 7 to separate the electric actuator 6 from the flight control surface 4. This makes it possible to prevent a malfunction that the flight control surface 4 becomes non-operable due to the malfunction of the electric actuator 6. For example, in a case where the electric actuator 6 is the EMA and jamming occurs in the EMA, it is possible to secure safety of the aircraft 2.

Figure 2:
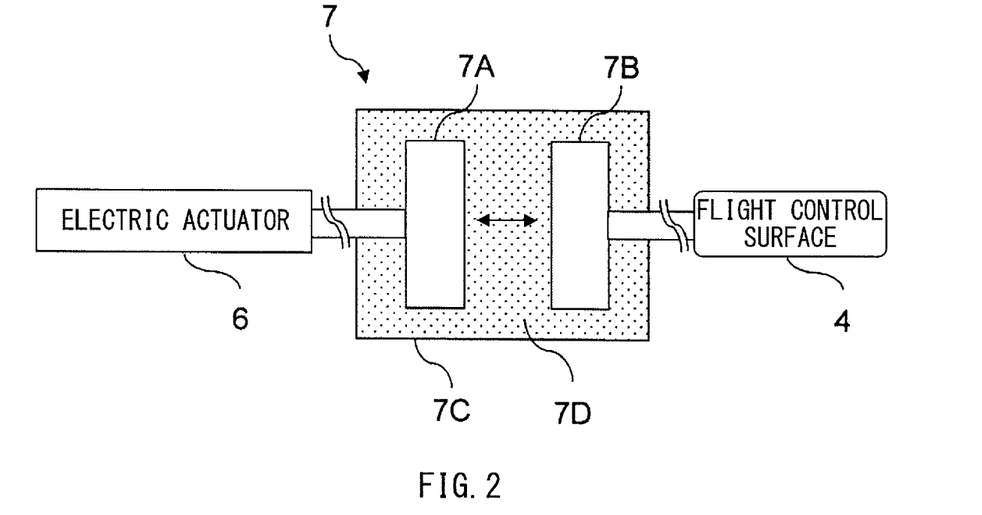
FIG. 2 is a diagram illustrating an example of a typical configuration of a clutch illustrated in FIG. 1.

FIG. 2 is a diagram illustrating an example of a typical configuration of the clutch 7 illustrated in FIG. 1.

The clutch 7 may switch power transmission from the electric actuator 6 to the flight control surface 4. The clutch 7 may include two rotating plates 7A and 7B. One rotating plate 7A may be coupled to the electric actuator 6. The other rotating plate 7B may be coupled to the flight control surface 4. The two rotating plates 7A and 7B may be switched between a state separated from each other and a state in contact with each other by any moving mechanism.

The clutch 7 may include an electric clutch such as an electromagnetic clutch or a functional fluid clutch. One reason for this may be that such a clutch does not require loading of a component such as a hydraulic system or many mechanical elements, which makes it possible to avoid an increase in weight due to loading of many components. When a magnetic field is applied to the electromagnetic clutch, the rotating plates 7A and 7B may come into contact with each other to transmit torque. When no magnetic field is applied to the electromagnetic clutch, the rotating plates 7A and 7B may be separated from each other not to transmit torque.

Non-limiting examples of the functional fluid clutch may include a magnetorheological (MR) fluid clutch and an electrorheological (ER) fluid clutch. The MR fluid clutch may be a clutch in which MR fluid is filled between the rotating plates 7A and 7B. Viscosity of the MR fluid may vary reversibly when a magnetic field is applied thereto. In contrast, the ER fluid clutch may be a clutch in which ER fluid is filled between the rotating plates 7A and 7B. Viscosity of the ER fluid may vary reversibly when an electric field is applied thereto.

Therefore, in a case where the clutch 7 is the functional fluid clutch, as illustrated in FIG. 2, functional fluid 7D may be filled inside a casing 7C. The casing 7C may house therein the two rotating plates 7A and 7B. Further, an electric circuit may be provided in the vicinity of the casing 7C. This electric circuit may generate an electric field or a magnetic field within the casing 7C. By using such a functional fluid clutch, it is possible to acquire an advantage that a response speed becomes higher compared with a case where an existing electromagnetic clutch is used.

The PA 8 may be an actuator that does not include a movable portion and is driven by applying AC voltage thereto. The PA 8 may be used in a case where torque is cut off by the clutch 7. The torque may be transmitted to the flight control surface 4 by driving of the electric actuator 6. Namely, the PA 8 may be a backup actuator to be used in a case where the electric actuator 6 has a malfunction.

Figure 3:
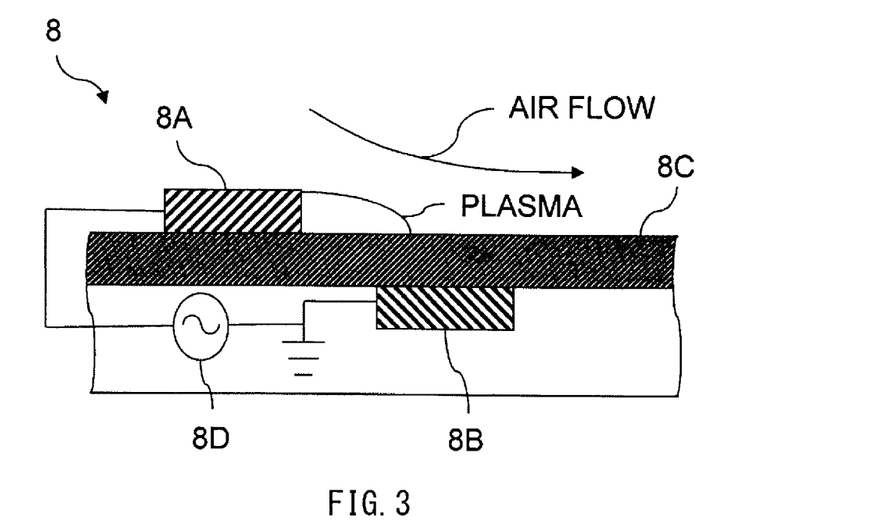
FIG. 3 is a cross-sectional view illustrating an example of a typical configuration of a PA illustrated in FIG. 1.

FIG. 3 is a cross-sectional view illustrating an example of a typical configuration of the PA 8 illustrated in FIG. 1.

The PA 8 may include a first electrode 8A, a second electrode 8B, a dielectric 8C, and an AC power source 8D. The first electrode 8A and the second electrode 8B may be disposed to allow a discharge area to be formed by putting the dielectric 8C between the first electrode 8A and the second electrode 8B and shifting the first electrode 8A and the second electrode 8B from each other with respect to the dielectric 8C. The first electrode 8A may be disposed in a state where the first electrode 8A is exposed to the outside. In contrast, the second electrode 8B may be covered with the dielectric 8C not to allow the second electrode 8B to be exposed to the outside. Further, the second electrode 8B may be grounded to an airframe of the aircraft 2. AC voltage may be applied between the first electrode 8A and the second electrode 8B by the AC power source 8D.

When the AC voltage is applied between the first electrode 8A and the second electrode 8B by operating the AC power source 8D, plasma including electrons and positive ions may be generated in the discharge area. The discharge area may be formed on a surface of the dielectric 8C on side where the first electrode 8A is disposed. As a result, the plasma may cause a flow of air toward the surface of the dielectric 8C to be induced. It is to be noted that the PA 8 in which dielectric barrier discharge (DBD) is generated by putting the dielectric 8C between the first electrode 8A and the second electrode 8B is called a DBD-PA.

The first electrode 8A and the second electrode 8B included in the PA 8 may be made into a thin film form. Therefore, by including the dielectric 8C in a surface layer of the flight control surface 4 and adhering the first electrode 8A and the second electrode 8B to respective two surface layers of the flight control surface 4, the flow of air may be formed on the surface of the flight control surface 4. Alternatively, both the first electrode 8A and the second electrode 8B may be embedded in the surface layer of the flight control surface 4 not to generate unevenness on the surface of the flight control surface 4.

When power transmission from the electric actuator 6 is cut by the clutch 7, the control surface of the flight control surface 4 may become free. In such a case, only aerodynamic force may act on the flight control surface 4, and there may be a risk that aerodynamic vibration occurs. It is to be noted that the aerodynamic vibration due to the air flow is called flattering. By attaching at least one of the PAs 8 to the flight control surface 4 and operating the at least one PA 8, it is possible to suppress or reduce the aerodynamic vibration of the flight control surface 4. For example, by controlling the PA 8 to be actuated to cause air resistance acting on the flight control surface 4 to be reduced, it is possible to suppress or reduce the aerodynamic vibration of the flight control surface 4. For example, by installing a plurality of PAs 8 at appropriate positions of the flight control surface 4 and controlling an appropriate PA 8 to be actuated in accordance with the air resistance, it is possible to improve an effect to suppress the aerodynamic vibration.

Further, by providing at least one PA 8 on each of an upper surface and a lower surface of the flight control surface 4, it becomes possible not only to suppress or reduce the aerodynamic vibration, but also to control the angle of the flight control surface 4 by controlling the PA 8. Namely, it is possible to generate the air flow by the PA 8, which makes it possible to turn a rudder of the aircraft 2 by using the aerodynamic force. For example, each of a PA 8 directed to making the angle of attack of the flight control surface 4 larger and a PA 8 directed to making the angle of attack of the flight control surface 4 smaller may be provided to at least one of the flight control surfaces 4. By switching the PAs 8 to be actuated, it becomes possible to control the angle of attack of the flight control surface 4.

Figure 4:
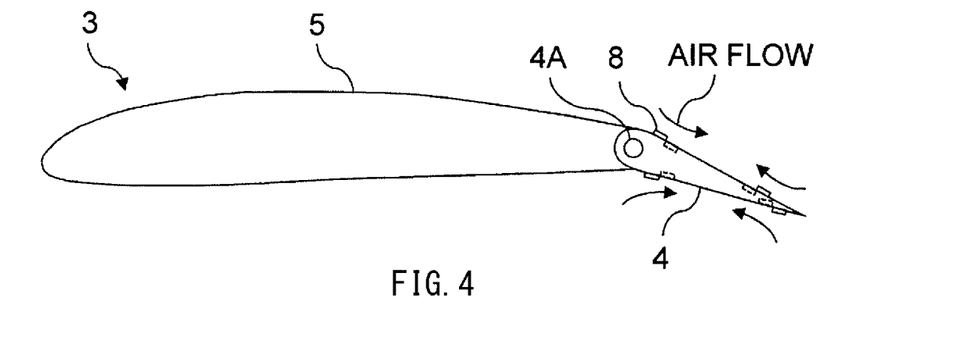
FIG. 4 is a lateral cross-sectional view of a flight control surface 4 illustrating a first arrangement example of the PA illustrated in FIG. 1.

FIG. 4 is a lateral cross-sectional view of the flight control surface 4 illustrating a first arrangement example of the PA 8 illustrated in FIG. 1.

As illustrated in FIG. 4 as an example, at least each of a leading edge of an upper surface of the flight control surface 4, a trailing edge of the upper surface of the flight control surface 4, a leading edge of the lower surface of the flight control surface 4, and a trailing edge of the lower surface of the flight control surface 4 may be provided with the PA 8, for example. In this case, at least four PAs 8 may be provided. As illustrated in FIG. 4, by attaching the plurality of PAs 8 to the flight control surface 4 to cause air flows to be respectively induced along flow lines with a plurality of directions that are different from each other and selecting the PA 8 to be actuated, it becomes possible to control not only steering force directed to turning of the flight control surface 4 that is the rudder, but also the angle of attack of the flight control surface 4.

In another example, the plurality of PAs 8 may be provided along a longitudinal direction of the flight control surface 4. By attaching the plurality of PAs 8 to the flight control surface 4 to thereby induce an even air flow along the flow line, it becomes possible to make the steering force greater.

Non-limiting examples of a suitable position at which the PA 8 is provided may include the vicinity of a rotary shaft 4A. The rotary shaft 4A may be used to vary the angle of attack of the flight control surface 4. One reason for this may be that the air flow is not separated from the flight control surface 4 in the vicinity of the rotary shaft 4A of the flight control surface 4 and a flow of air is easily formed when the PA 8 is actuated. Therefore, in one example, as illustrated in FIG. 4, at least one of the PAs 8 may be disposed in the vicinity of the rotary shaft 4A of the flight control surface 4 in a case where the PAs 8 are provided on the upper surface side and the lower surface side of the flight control surface 4. Further, in another example, a single PA 8 may be disposed in the vicinity of the rotary shaft 4A of the flight control surface 4 also in a case where the single PA 8 is provided on the surface of the flight control surface 4.

Figure 5:
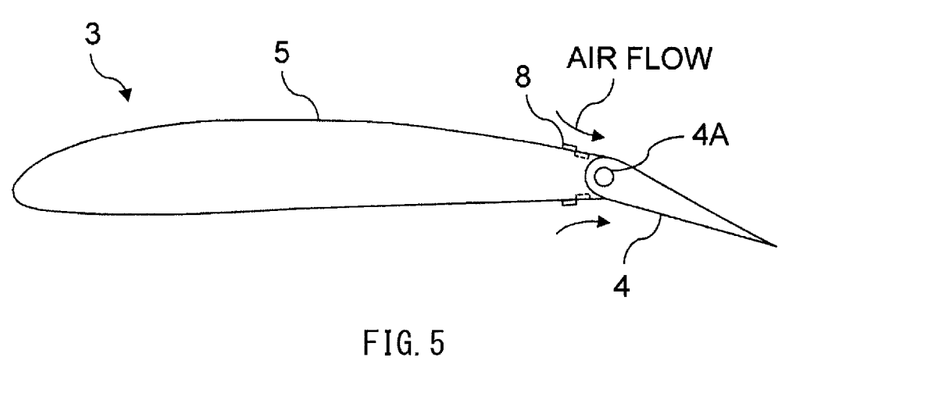
FIG. 5 is a lateral cross-sectional view of the flight control surface 4 illustrating a second arrangement example of the PA illustrated in FIG. 1.

FIG. 5 is a lateral cross-sectional view of the flight control surface 4 illustrating a second arrangement example of the PA 8 illustrated in FIG. 1.

An arranged position of the PA 8 is not limited to a position on the control surface of the flight control surface 4. The PA 8 may be arranged in the vicinity of the control surface. For example, as illustrated in FIG. 5, the PAs 8 may be disposed on surfaces of the fixed wing 5 in the vicinity of the rotary shaft 4A of the flight control surface 4.

Figure 6:
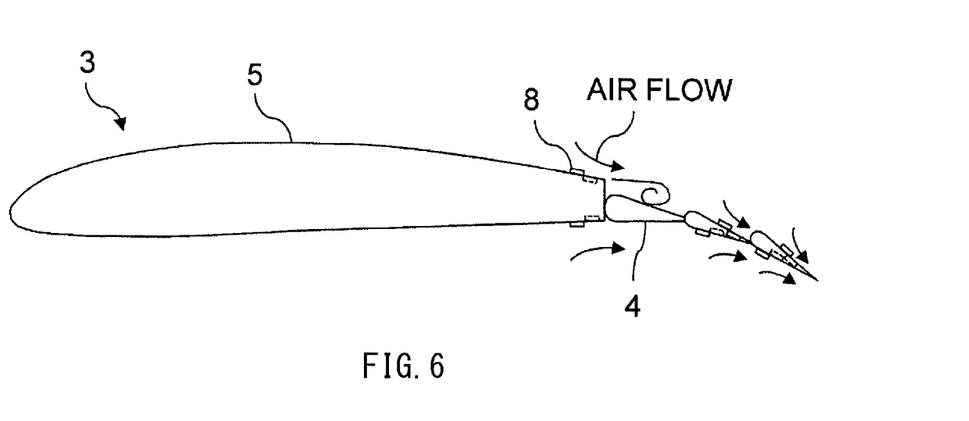
FIG. 6 is a lateral cross-sectional view of the flight control surface 4 illustrating a third arrangement example of the PA illustrated in FIG. 1.

FIG. 6 is a lateral cross-sectional view of the flight control surface 4 illustrating a third arrangement example of the PA 8 illustrated in FIG. 1.

As illustrated in FIG. 6, in a case where a plurality of flight control surfaces 4 is coupled to the fixed wing 5, the PAs 8 may be attached to upper and lower surfaces of the fixed wing 5 or control surfaces of upper and lower surfaces of each of the flight control surfaces 4. Namely, it is possible to arrange the appropriate number of PAs 8 at appropriate positions to control the angle of attack of each of the plurality of flight control surfaces 4.

The PA 8, the clutch 7, and the electric actuator 6 are controlled by the controller 9. Namely, the controller 9 may serve to control the electric actuator 6, the clutch 7, and the PA 8. Each of the electric actuator 6, the clutch 7, and the PA 8 may be operated by an electric signal. The controller 9 may include an electronic circuit such as an arithmetic circuit that is caused to read a computer program.

In a case where the aircraft 2 is an unmanned aircraft, the aircraft 2 may be typically operated by remote control. Namely, a control signal denoting a steering instruction for the aircraft 2 may be given to the controller 9 by wireless communication. In this case, an input device that gives the steering instruction to the controller 9 may be installed at a remote location. A radio machine directed to receiving of a radio signal that denotes a steering instruction may be coupled to the controller 9. Therefore, an input device 10 mounted on the aircraft 2 for the controller 9 may be a radio machine.

Further, in a case where the unmanned aircraft is automatically operated by a program created in advance and denoting a steering instruction, the program denoting the steering instruction may be stored in a memory circuit in the controller 9, and the controller 9 may control the electric actuator 6, the clutch 7, and the PA 8 in accordance with the program.

In contrast, in a case where the aircraft 2 is a manned aircraft, a flight controller including a control stick, a lever, and a switch may be provided in a cockpit as the input device 10 for the controller 9. A pilot may be allowed to operate the input device 10 to input a control signal to the controller 9. The control signal may denote the steering instruction. Alternatively, a control signal denoting a steering instruction may be generated in the controller 9 by an automatic operation program created in advance, and the pilot may operate the input device 10 if necessary.

The electric actuator 6 may be a mechanical element directed to execution of steering of the flight control surface 4. The controller 9 may generate a control signal for the electric actuator 6 on the basis of, for example but not limited to, a steering instruction related to the angle of attack of the flight control surface 4, which is inputted to the controller 9 from the input device 10 such as the control stick, or a steering instruction that is inputted to the controller 9 from a remote location by wireless communication. The controller 9 may output the generated control signal to the electric actuator 6.

For example, the controller 9 may calculate an angle difference between a current angle of attack of the flight control surface 4 and a target value of the angle of attack of the flight control surface 4, moving quantity of the electric actuator 6 corresponding to the angle difference to the target value of the angle of attack, and a rotation angle of the electric motor 6A corresponding to the moving quantity of the electric actuator 6. The controller 9 may thereafter control the electric motor 6A of the electric actuator 6 to cause the electric motor 6A to rotate by the calculated rotation angle. This makes it possible to control the angle of attack of the flight control surface 4 to a desired angle of attack.

The clutch 7 may be a mechanical element that becomes a control target in a case where the electric actuator 6 has a malfunction. In a case where the aircraft 2 is a manned aircraft, the pilot may be allowed to manually operate the clutch 7 in one example. In such a case, the input device 10 such as a switch or a lever directed to operating of the clutch 7 may be provided in a pilot cabin. In a case where an instruction to actuate the clutch 7, that is, an instruction to separate the electric actuator 6 from the flight control surface 4 is inputted to the controller 9 from the input device 10 such as the switch or the lever, the controller 9 may generate an operation signal for the clutch 7 and output the generated signal to the clutch 7.

For example, the controller 9 may generate a control signal to control a generation circuit for an electric field or magnetic field to generate the electric field or magnetic field directed to separation of the rotating plates 7A and 7B of the clutch 7 from each other. When the control signal generated by the controller 9 is outputted to the generation circuit for the electric field or magnetic field, the electric field or magnetic field may be applied to the rotating plates 7A and 7B by the generation circuit for the electric field or magnetic field. This may cause the rotating plates 7A and 7B of the clutch 7 to be separated from each other, whereby the electric actuator 6 may be separated from the flight control surface 4.

Further, the controller 9 may serve to automatically actuate the clutch 7 in a case where the electric actuator 6 has a malfunction. In order to automatically actuate the clutch 7, it may be also necessary to automatically detect the malfunction of the electric actuator 6 such as jamming that becomes a problem in the EMA. Here, a sensor 11 directed to measurement of the angle of attack of the flight control surface 4 may be typically provided in the aircraft 2.

The sensor 11 directed to measurement of the angle of attack of the flight control surface 4 may include, for example but not limited to, a rotation sensor or a linear displacement sensor. In a case where the sensor 11 includes the rotation sensor, by attaching the rotation sensor to the rotary shaft 4A of the flight control surface 4, the angle of attack of the flight control surface 4 may be measured directly. In contrast, in a case where the sensor 11 includes the linear displacement sensor, a rod may be coupled to the flight control surface 4. The rod may move linearly in accordance with variation in the angle of attack of the flight control surface 4. The linear displacement sensor may measure moving quantity of the rod. By converting the moving quantity of the rod into the variation in the angle of attack of the flight control surface 4, the angle of attack of the flight control surface 4 may be measured indirectly.

Therefore, the sensor 11 directed to measurement of the angle of attack of the flight control surface 4 may be used to detect a malfunction of the electric actuator 6. Namely, for example but not limited to, a malfunction of the hydraulic system or a malfunction of the electric actuator 6 such as jamming may be automatically detected on the basis of deviation quantity of a difference or ratio between an actual angle of attack of the flight control surface 4 measured by the sensor 11 and a control value for the angle of attack of the flight control surface 4. The control value for the angle of attack of the flight control surface 4 may be outputted from the controller 9 to the electric actuator 6. For example, in a case where the actual angle of attack of the flight control surface 4 is different from the control value for the angle of attack of the flight control surface 4 outputted from the controller 9 to the electric actuator 6 by a threshold value or greater, occurrence of a malfunction in the electric actuator 6 may be determined automatically.

The controller 9 may also serve to automatically determine whether a malfunction occurs in the electric actuator 6 or not. Therefore, an output terminal of the sensor 11 may be coupled to the controller 9. The controller 9 may automatically detect a malfunction of the electric actuator 6 on the basis of a detected signal from the sensor 11. In a case where the controller 9 the malfunction of the electric actuator 6, by automatically actuating the clutch 7, the torque to be transmitted from the electric actuator 6 to the flight control surface 4 may be cut off automatically.

When the torque to be transmitted from the electric actuator 6 to the flight control surface 4 is cut off, the flight control surface 4 may become free, which may cause a risk that the flight control surface 4 may vibrate by the aerodynamic force. Therefore, the PA 8 may be controlled in place of the electric actuator 6 in order to suppress or reduce the aerodynamic vibration, or in order to adjust the angle of attack of the flight control surface 4.

The PA 8 may also be controlled manually or automatically as with the clutch 7. In a case where a manual operation for the PA 8 is allowed, the input device 10 directed to operation of the PA 8 may be provided in the pilot cabin. In a case where an operation instruction for the PA 8 is inputted to the controller 9 from the input device 10, the controller 9 may generate a control signal for the PA 8. Further, by outputting the generated control signal to the PA 8, the PA 8 may be actuated.

In contrast, in a case where the PA 8 is automatically actuated, the PA 8 may be actuated, as with the clutch 7, by using detection of a malfunction in the electric actuator 6 as a trigger. Alternatively, the PA 8 may be automatically actuated by a situation, as a trigger, that the torque to be transmitted from the electric actuator 6 to the flight control surface 4 is cut off by an operation of the clutch 7. Namely, in a case where a malfunction of the electric actuator 6 is detected on the basis of the detected signal from the sensor 11, the controller 9 may be allowed to automatically actuate not only the clutch 7 but also the PA 8.

In a case where the PA 8 is actuated to suppress or reduce the aerodynamic vibration of the flight control surface 4, the PA 8 may merely be switched from an OFF state to an ON state. Therefore, to allow for the manual operation for the PA 8, it may be enough that the input device 10 such as a switch or a lever directed to switching of each of the PAs 8 from the OFF state to the ON state is provided in the pilot cabin. In a case where an instruction to switch the PA 8 specified by the input device 10 from the OFF state to the ON state is inputted to the controller 9, the controller 9 may output a control signal to the AC power source 8D for the specified PA 8, whereby switching the specified PA 8 to the ON state. This may cause an air flow to be generated in the vicinity of the specified PA 8, whereby it is possible to suppress or reduce the aerodynamic vibration of the flight control surface 4.

Further, in a case where the PA 8 is automatically actuated to suppress or reduce the aerodynamic vibration of the flight control surface 4, a malfunction of the electric actuator 6 is detected, and the torque to be transmitted from the electric actuator 6 to the flight control surface 4 is cut off, the controller 9 may output a control signal to the AC power source 8D for the PA 8, whereby switching the PA 8 to the ON state. Namely, the controller 9 may control the PA 8, whereby it is possible to suppress or reduce the aerodynamic vibration of the flight control surface 4.

However, in a case where a plurality of PAs 8 is attached to the flight control surface 4, it may be important to specify an appropriate PA 8 to be actuated to suppress or reduce the aerodynamic vibration of the flight control surface 4. The controller 9 may automatically specify the PA 8 that allows an air flow contributing to reduction of the aerodynamic vibration to be generated, and output a control signal to the AC power source 8D for the specified PA 8. This may allow for switching of the specified PA 8 to the ON state.

Non-limiting examples of a method of automatically specifying the PA 8 to be actuated may include a method of detecting a vibration direction of the flight control surface 4 by the aerodynamic force and specifying, as an operation target, a PA 8 that allows an air flow counteracting the aerodynamic vibration of the flight control surface 4 to be induced. The vibration direction of the flight control surface 4 by the aerodynamic force may be detected on the basis of a detected signal denoting temporal variation of the angle of attack obtained from the sensor 11.

Further, a parameter of the PA 8 that becomes a control target is not limited to identification information of the PA 8 to be actuated. A parameter to specify a factor such as amplitude or a waveform of AC voltage that is applied between the first electrode 8A and the second electrode 8B from the AC power source 8D to each of the PAs 8 may be used. For example, in a case where typical AC voltage including a continuous wave is applied between the first electrode 8A and the second electrode 8B from the AC power source 8D, amplitude of the AC voltage including the continuous wave may be used as the parameter of the PA 8 that becomes the control target.

However, in order to allow the aerodynamic force of the air flow induced by the PA 8 to be adjusted, it may be more effective that the waveform of the AC voltage includes a burst wave in place of the continuous wave. One reason for this may be that it is possible to easily control amplitude and burst frequency when the AC voltage includes the burst wave. It is to be noted that the burst wave may be a wave in which a waveform of the AC voltage is repeated intermittently and periodically.

By allowing the AC voltage to be applied between the first electrode 8A and the second electrode 8B from the AC power source 8D for each of the PAs 8 to include the burst wave, the burst frequency and the amplitude of the burst wave may be set as control targets. In a case where the burst frequency and the amplitude of the burst wave are set as the control targets, steering of the flight control surface 4 may be executed more finely. For example, feedback control to minimize vibration of the flight control surface 4 may be executed.

For example, vibration including the vibration direction and the amplitude of the flight control surface 4 may be detected on the basis of the detected signal outputted from the sensor 11. By using, as parameters, the identification information of the PA 8 to be selected as an operation target and the burst frequency and the amplitude of the burst wave to be applied between the first electrode 8A and the second electrode 8B of the PA 8 selected as the operation target, the feedback control may be executed to cause the vibration of the flight control surface 4 to be suppressed.

In one example, the pilot may be allowed to manually carry out specification of the PA 8 to be actuated and setup of the burst frequency and the amplitude of the burst wave to be applied between the first electrode 8A and the second electrode 8B of the specified PA 8 by means of an operation of the input device 10. Alternatively, as described above, the AC voltage that is not the burst wave but the continuous wave may be applied between the first electrode 8A and the second electrode 8B to set the amplitude of the continuous wave as a control target.

It is possible to use each of the PAs 8 not only to suppress or reduce the aerodynamic vibration as described above, but also to control the angle of attack of the flight control surface 4 to a desired angle. Namely, by controlling the plurality of PAs 8 in place of the electric actuator 6, the steering of the aircraft 2 may be executed. The PA 8 to be actuated to set the angle of attack of the flight control surface 4 to a given value, and the burst frequency and the amplitude of the burst wave or the amplitude of the continuous wave to be applied between the first electrode 8A and the second electrode 8B of each of the PAs 8 may be checked in advance by, for example but not limited to, a wind-tunnel test or simulation. This makes it possible to execute the steering of the aircraft 2 by a manual operation or automatic operation for each of the PAs 8.

In a case where the steering of the aircraft 2 that is a manned aircraft is carried out manually, the steering may be typically carried out by an operation of the control stick. In a case where the steering of the aircraft 2 that is an unmanned aircraft is carried out manually, the steering may be typically carried out by an operation of a controller provided at a remote location. In a case where the torque to be transmitted from the electric actuator 6 to the flight control surface 4 is cut off, the controller 9 may be allowed to control each of the PAs 8 on the basis of control information for the flight control surface 4. The control information may be inputted from the flight controller of the aircraft 2. For example, in addition to the PA 8 that becomes an operation target, at least one of the amplitude of the AC voltage including the continuous wave and the burst frequency and the amplitude of the burst wave of the AC voltage including the burst wave, which are applied between the first electrode 8A and the second electrode 8B included in the PA 8 may be controlled on the basis of the control information for the flight control surface 4 inputted through the steering of the flight controller such as the control stick.

Namely, when the pilot operates the control stick, the controller 9 may be allowed to control each of the PAs 8 to switch the necessary PA 8 to the ON state, and to adjust the waveform including the amplitude of the AC voltage to be applied to the PA 8 whose state is switched into the ON state. This makes it possible to continuously execute the steering of the aircraft 2 by actuating the plurality of PAs 8 appropriately even though the electric actuator 6 has a malfunction.

It is to be noted that the steering using the PA 8 may be limited to a case where the aircraft 2 flies at low speed, for example, upon attempting to land and the angle of attack of the flight control surface 4 is larger. In this case, it becomes possible to limit conditions for the wind-tunnel test or the simulation.

Next, examples of a coupling structure of the electric actuator 6, the clutch 7, and the wing 3 will be described.

Figure 7:
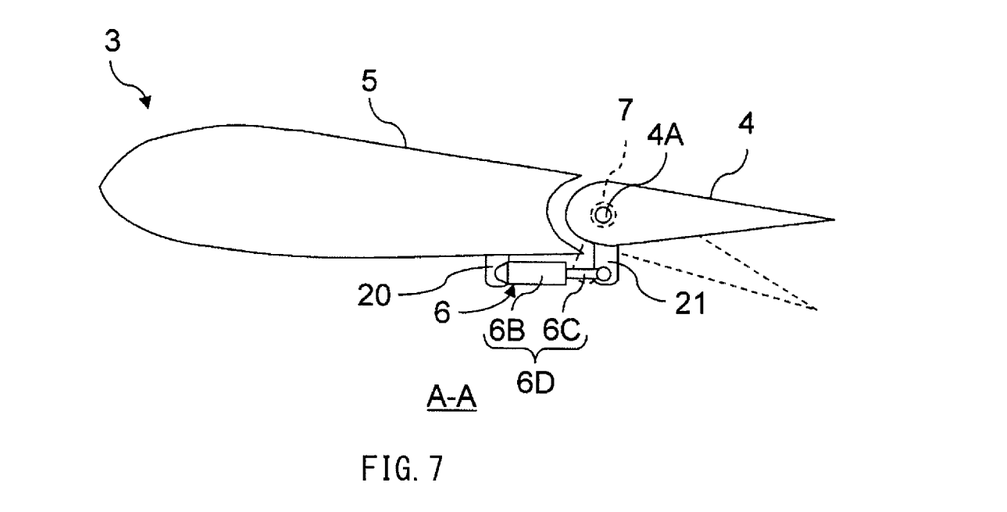
FIG. 7 is a partial cross-sectional view illustrating a first structural example including a coupling structure of an electric actuator, the clutch, and a wing illustrated in FIG. 1.
Figure 8:
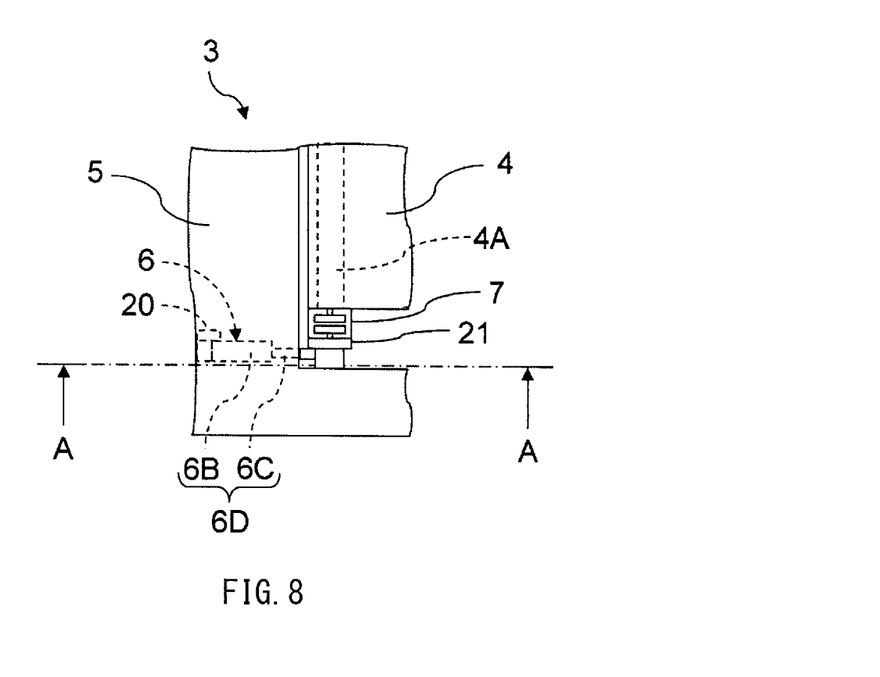
FIG. 8 is a partial top view of the electric actuator, the clutch, and the wing illustrated in FIG. 7.

FIG. 7 is a partial cross-sectional view illustrating a first structural example including a coupling structure of the electric actuator 6, the clutch 7, and the wing 3 illustrated in FIG. 1. FIG. 8 is a partial top view of the electric actuator 6, the clutch 7, and the wing 3 illustrated in FIG. 7. It is to be noted that FIG. 7 is a partial cross-sectional view taken by a line A-A illustrated in FIG. 8.

In a case where the electric actuator 6 such as the EMA or the EHA includes a power cylinder 6D in which a rod 6C is moved with respect to a cylinder tube 6B, side of the cylinder tube 6B may be fixed to the fixed wing 5 via an arm 20 such as a horn arm or an L-shaped arm. In contrast, an arm 21 such as a horn arm or an L-shaped arm may be coupled to the rotary shaft 4A directed to variation of the angle of attack of the flight control surface 4 via the clutch 7.

Namely, by putting the clutch 7 into a coupled state, torque of the arm 21 may be transmitted to the rotary shaft 4A because the arm 21 is fixed to the rotary shaft 4A. By putting the clutch 7 into an uncoupled state, the torque of the arm 21 may be prevented from being transmitted to the rotary shaft 4A because the arm 21 is separated from the rotary shaft 4A.

Further, a tip of the rod 6C included in the electric actuator 6 may be rotatably coupled to one end of the arm 21. In other words, the one end of the arm 21 may be rotatably coupled to the tip of the rod 6C by means of a joint. Further, the other end of the arm 21 may be coupled to the rotary shaft 4A of the flight control surface 4 via the clutch 7.

This makes it possible to switch the electric actuator 6 and the flight control surface 4 between a coupled state and an uncoupled state by the operation of the clutch 7. Namely, in a case where the electric actuator 6 has a malfunction, by actuating the clutch 7, the torque to be transmitted from the rod 6C of the electric actuator 6 to the rotary shaft 4A of the flight control surface 4 via the arm 21 may be cut off.

Figure 9:
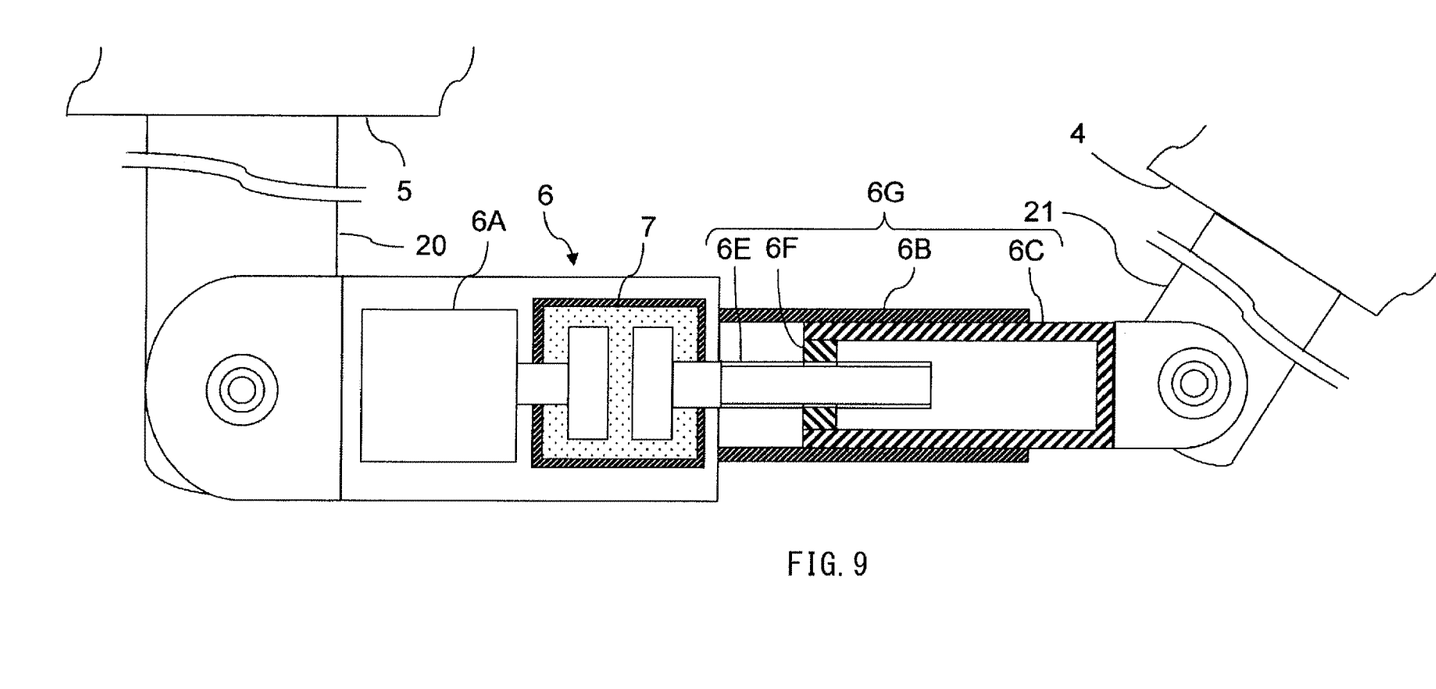
FIG. 9 is a partial cross-sectional view illustrating a second structural example including the coupling structure of the electric actuator, the clutch, and the wing illustrated in FIG. 1.

FIG. 9 is a partial cross-sectional view illustrating a second structural example including the coupling structure of the electric actuator 6, the clutch 7, and the wing 3 illustrated in FIG. 1.

As illustrated in FIG. 9, in one example, the clutch 7 may be built in the electric actuator 6. In a case where the electric actuator 6 is a typical EMA, a ball screw 6E, that is rotated by the electric motor 6A may be disposed in the cylinder tube 6B, and a nut 6F may be fixed to one end of the rod 6C. The nut 6F may be moved linearly by means of rotation of the ball screw 6E. By rotating the ball screw 6E, the rod 6C may be moved in parallel by a distance corresponding to a rotation angle. Namely, an electric cylinder 6G including, for example but not limited to, the cylinder tube 6B, the ball screw 6E, the nut 6F, and the rod 6C may be expanded and contracted.

In the EMA having such a structure, the clutch 7 may be interposed between the output shaft of the electric motor 6A and the ball screw 6E. Further, the cylinder tube 6B may be rigidly fixed to the fixed wing 5 via the arm 20, and the tip of the rod 6C may be rotatably coupled to the arm 21 rigidly fixed to the flight control surface 4.

This makes it possible to switch the electric actuator 6 and the flight control surface 4 between the coupled state and the uncoupled state by the operation of the clutch 7. Namely, in a case where the electric actuator 6 has a malfunction, by actuating the clutch 7, the torque to be transmitted from the rod 6C of the electric actuator 6 to the rotary shaft 4A of the flight control surface 4 via the arm 21 may be cut off.

It is to be noted that the output shaft of the electric motor 6A may be coupled to the ball screw 6E with, for example but not limited to, a gear or a belt, without coaxially arranging the output shaft of the electric motor 6A and the ball screw 6E with each other. Further, also in a case where the electric actuator 6 is the EHA, for example, by interposing the clutch 7 between the output shaft of the electric motor 6A and the hydraulic pump, the clutch 7 may be built in the electric actuator 6.

Figure 10:
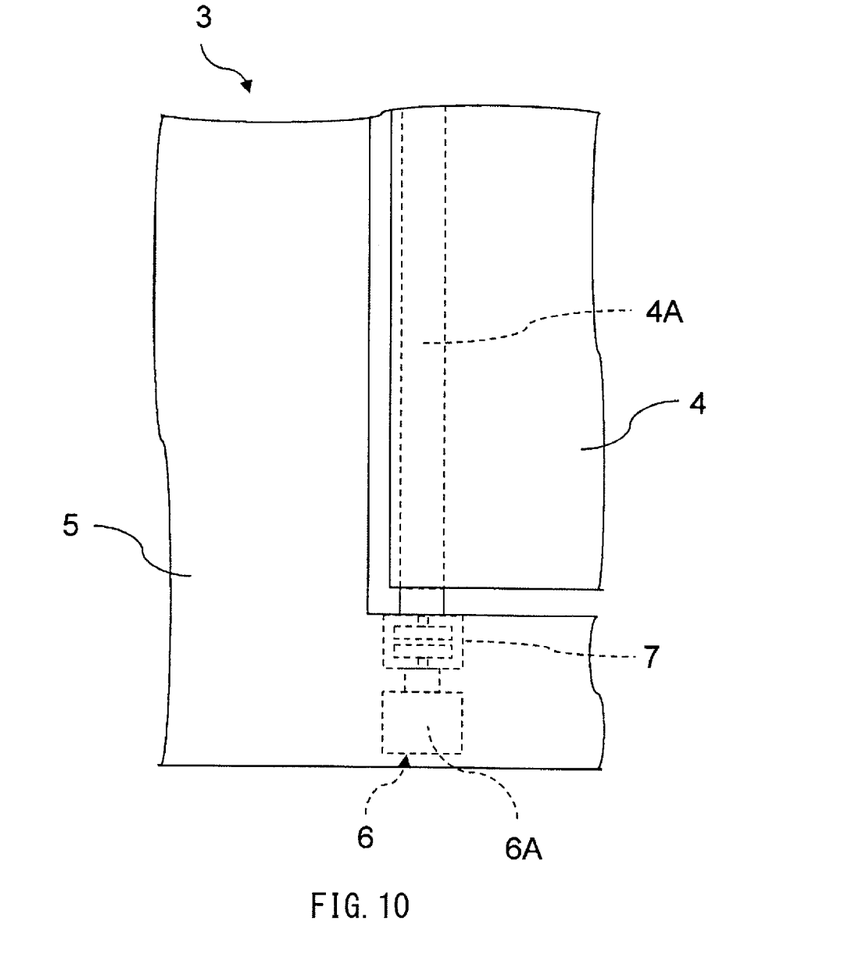
FIG. 10 is a partial top view of the wing illustrating a third structural example including the coupling structure of the electric actuator, the clutch, and the wing illustrated in FIG. 1.

FIG. 10 is a partial top view of the wing 3 illustrating a third structural example including the coupling structure of the electric actuator 6, the clutch 7, and the wing 3 illustrated in FIG. 1.

As illustrated as an example in FIG. 10, the electric actuator 6 may include the electric motor 6A configured to rotate the rotary shaft 4A of the flight control surface 4 without using the power cylinder. Namely, a casing of the electric motor 6A may be rigidly fixed to the fixed wing 5. This may cause the output shaft of the electric motor 6A to be coupled to the rotary shaft 4A of the flight control surface 4. In this case, the clutch 7 may be disposed between the output shaft of the electric motor 6A and the rotary shaft 4A.

This makes it possible to switch the electric actuator 6 and the flight control surface 4 between the coupled state and the uncoupled state by the operation of the clutch 7. Namely, in a case where the electric actuator 6 has a malfunction, by actuating the clutch 7, the torque to be transmitted to the rotary shaft 4A of the flight control surface 4 from the output shaft of the electric motor 6A included in the electric actuator 6 may be cut off.

It is to be noted that the output shaft of the electric motor 6A may be coupled to the rotary shaft 4A with, for example but not limited to, a gear or a belt, without coaxially arranging the output shaft of the electric motor 6A and the rotary shaft 4A with each other.

[Aircraft Steering Method]

Next, a steering method for the flight control surface 4 of the aircraft 2 by the steering system 1 will be described.

Figure 11:
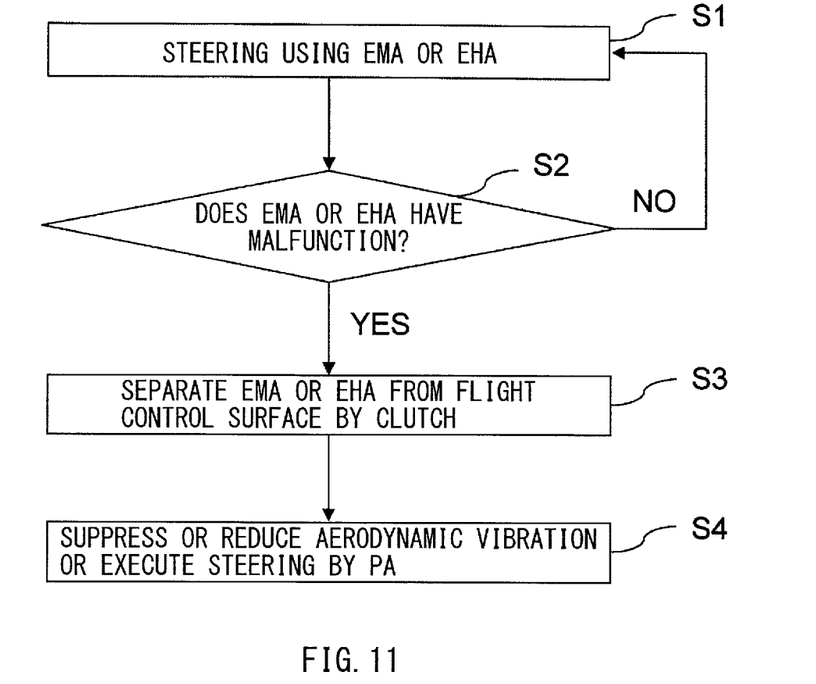
FIG. 11 is a flowchart illustrating an example of a steering method of the flight control surface 4 in the steering system 1 illustrated in FIG. 1.

FIG. 11 is a flowchart illustrating a steering method for the flight control surface 4 in the steering system 1 illustrated in FIG. 1.

As indicated in Step S1, steering of the flight control surface 4 may be executed using the electric actuator 6 such as the EMA or the EHA. This steering may be also executed when the aircraft 2 takes off. When the aircraft 2 takes off, in Step S2, the controller 9 may substantially always determine whether the electric actuator 6 has a malfunction. In a case where the aircraft 2 is a manned aircraft, the pilot of the aircraft 2 may carry out determination as to whether the electric actuator 6 has a malfunction or not. Further, in a case where the aircraft 2 is an unmanned aircraft, the controller 9 may automatically execute determination as to whether the electric actuator 6 has a malfunction or not on the basis of deviation quantity between a measured value and a control value of the angle of attack of the flight control surface 4. The angle of attack of the flight control surface 4 may be detected by using the sensor 11.

The steering using the electric actuator 6 in Step S1 may be continued unless the controller 9 determines that the electric actuator 6 has a malfunction. Namely, in a case where the controller 9 determines NO in the determination in Step S2, the steering using the electric actuator 6 in Step S1 may be continued.

In a case where the controller 9 determines YES in the determination in Step S2, that is, in a case where the controller 9 determines that the electric actuator 6 has a malfunction, in Step S3, the controller 9 operates the clutch 7 to separate the electric actuator 6 from the flight control surface 4. This causes the control surface of the flight control surface 4 to become free. The pilot may manually carry out the operation of the clutch 7 by operating the input device 10 such as the switch or the lever. Alternatively, the controller 9 may automatically execute the operation of the clutch 7 in a case where the controller 9 determines that the electric actuator 6 has a malfunction.

Next, in Step S4, the PA 8 may suppress or reduce aerodynamic vibration, or the PA 8 may execute the steering. Namely, the controller 9 may actuate the PA 8 as a redundant system for the electric actuator 6. The pilot may also manually carry out an operation of the PA 8 by operating the input device 10 such as the switch or the lever. Alternatively, the controller 9 may automatically execute the operation of the PA 8 in a case where the controller 9 determines that the electric actuator 6 has a malfunction.

For example, the PA 8 may allow the aerodynamic vibration of the flight control surface 4 to be suppressed or reduced. Alternatively, by controlling the plurality of PAs 8, it is possible to adjust the angle of attack of the flight control surface 4. Such a control for the PA 8 may allow safety of the aircraft 2 to be maintained even though the electric actuator 6 has a malfunction.

It is to be noted that each of many aircrafts 2 includes a plurality of flight control surfaces 4. Therefore, by steering at least one of the flight control surfaces 4 included in the aircraft 2 by the steering system 1, it is possible to improve safety of the aircraft 2.

Example Effects

The steering system 1 for the aircraft 2 and the steering method for the aircraft 2 as described above may be configured to: couple the electric actuator 6 directed to variation of the angle of attack of the flight control surface 4 to the flight control surface 4 via the clutch 7; operate the clutch 7 to separate the electric actuator 6 from the flight control surface 4 in a case where the electric actuator 6 has a malfunction; and control the PA 8 arranged in the vicinity of the flight control surface 4 or at the flight control surface 4 to suppress or reduce the aerodynamic vibration or execute steering of the flight control surface 4.

Therefore, according to the steering system 1 for the aircraft 2 and the steering method for the aircraft 2, it is possible to immediately cut off power to be transmitted from the electric actuator 6 to the flight control surface 4 by the operation of the clutch 7 in a case where a malfunction occurs in the electric actuator 6 such as the EMA or the EHA. Moreover, it is possible to use the PA 8, which is provided on the wing 3 as the redundant system for the electric actuator 6, as a temporary actuator. For this reason, by controlling the plurality of PAs 8, it is possible not only to suppress or reduce the aerodynamic vibration, but also to execute steering of the flight control surface 4.

Further, even though jamming occurs in the EMA, it is possible to immediately separate the EMA from the flight control surface 4 by the operation of the clutch 7. Therefore, it becomes easier to adopt an EMA that does not require a hydraulic system as the electric actuator 6. As a result, it is possible to reduce weight of the aircraft 2 and simplify a structure of the aircraft 2 while eliminating the necessity of the hydraulic system from a flight control system and maintaining the redundancy of the aircraft 2. Further, by including the EMA in the electric actuator 6, it is possible to eliminate necessity of maintenance of a component such as hydraulic piping, and to reduce labor required for maintenance of the electric actuator 6.

Other Example Implementations

Although some implementations of the technology have been described in the foregoing, the implementations described above are merely illustrative and should not be construed as limiting the scope of the technology. The novel method and system described herein as example implementations of the technology may be embodied in the form of any other implementation. Further, it should be appreciated that various omissions, modifications, and alterations may be made to example implementations of the technology described herein without departing from the scope as defined by the appended claims. The appended claims and equivalents are intended to encompass such omissions, modifications, and alterations as various implementations and modification examples of the technology in so far as they fall within the scope of the appended claims or the equivalents thereof.

The controller 9 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the controller 9 illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the controller 9 illustrated in FIG. 1.

The invention claimed is:

1. An aircraft steering system comprising:
an electric actuator configured to vary an angle of a flight control surface of an aircraft;
a clutch configured to cut off torque driving of the electric actuator, the torque being to be transmitted to the flight control surface;
at least one plasma actuator configured to form a flow of air on a surface of the flight control surface when the torque is cut off; and
a controller configured to control the electric actuator, the clutch, and the at least one plasma actuator, wherein
the controller is further configured to control the plasma actuator on a basis of control information for the flight control surface when the torque is cut off, the control information being inputted from a flight controller of the aircraft.

2. The aircraft steering system according to claim 1, wherein the electric actuator comprises an electromechanical actuator.

3. The aircraft steering system according to claim 1, further comprising a sensor configured to detect a malfunction of the electric actuator, wherein the controller is further configured to actuate, when the sensor detects the malfunction of the electric actuator, the clutch to automatically cut off the torque.

4. The aircraft steering system according to claim 3, wherein the controller is further configured to automatically actuate the plasma actuator when the sensor detects the malfunction of the electric actuator.

5. The aircraft steering system according to claim 1, wherein the controller is further configured to control, when the torque is cut off, the plasma actuator to perform one or both of suppression and reduction of aerodynamic vibration of the flight control surface.

6. The aircraft steering system according to claim 1, wherein the controller is further configured to control at least one of amplitude of alternating-current voltage including a continuous wave, burst frequency of alternating-current voltage including a burst wave, and amplitude of the burst wave on the basis of the control information for the flight control surface, the continuous wave being applied between electrodes included in the plasma actuator, the burst wave being applied between the electrodes included in the plasma actuator.

7. The aircraft steering system according to claim 1, wherein
the at least one plasma actuator comprises at least two plasma actuators,
an upper surface of the flight control surface is provided with at least one of the at least two plasma actuators, and
a lower surface of the flight control surface is provided with at least one of the at least two plasma actuators.

8. The aircraft steering system according to claim 7, wherein the at least one plasma actuator comprises at least four plasma actuators,
and
at least a leading edge of the upper surface of the flight control surface, a trailing edge of the upper surface of the flight control surface, a leading edge of the lower surface of the flight control surface, and a trailing edge of the lower surface of the flight control surface are each provided with any of the at least four plasma actuators.

9. The aircraft steering system according to claim 1, wherein the clutch comprises an electric clutch.

10. The aircraft steering system according to claim 1, wherein the electric actuator includes a power cylinder in which a rod is moved with respect to a cylinder tube, and
a tip of the rod is rotatably coupled, via the clutch, to a first end of an arm, and a second end of the arm is coupled to a rotary shaft configured to vary an angle of attack of the flight control surface via the clutch.

11. The aircraft steering system according to claim 1, wherein
the electric actuator includes an electric motor that rotates a rotary shaft configured to vary an angle of attack of the flight control surface, and
the clutch is disposed between the electric motor and the rotary shaft.

12. An aircraft comprising the aircraft steering system according to claim 1.

13. An aircraft steering method comprising steering at least a moveable wing of the aircraft using the aircraft steering system according to claim 1.

* * * * *